United States Patent [19]

Yokoyama et al.

[11] Patent Number: 5,250,655
[45] Date of Patent: Oct. 5, 1993

[54] MELT PREPARATION OF POLYCARBONATE WITH METAL COMPOUND AND P COMPOUND CATALYSTS

[75] Inventors: Masuzo Yokoyama; Junji Takano; Kazuhide Takakura, all of Yokkaichi, Japan

[73] Assignee: Mitsubishi Petrochemical Company, Ltd., Tokyo, Japan

[21] Appl. No.: 934,716

[22] Filed: Aug. 24, 1992

[30] Foreign Application Priority Data

Sep. 24, 1991 [JP] Japan ................... 3-243673

[51] Int. Cl.⁵ ............................. C08G 64/30
[52] U.S. Cl. ..................... 528/200; 524/611; 526/65; 528/125; 528/126; 528/171; 528/196; 528/198
[58] Field of Search ........... 528/200, 196, 198, 125, 528/126, 171; 524/611

[56] References Cited

U.S. PATENT DOCUMENTS

| 2,997,459 | 8/1961 | Schnell et al. | 528/200 |
| 3,305,520 | 2/1967 | Fritz et al. | 260/45.7 |
| 3,404,122 | 10/1968 | Fritz et al. | 260/45.7 |

FOREIGN PATENT DOCUMENTS

| 50-51154 | 5/1975 | Japan . | |
| 52-147655 | 12/1977 | Japan . | |
| 61-151236 | 7/1986 | Japan . | |
| 62-158719 | 7/1987 | Japan . | |
| 62-169821 | 7/1987 | Japan . | |
| 2158719 | 7/1987 | Japan | 528/200 |
| 2-180954 | 7/1990 | Japan . | |
| 3-54223 | 3/1991 | Japan . | |

*Primary Examiner*—Harold D. Anderson
*Attorney, Agent, or Firm*—Dilworth & Barrese

[57] ABSTRACT

An aromatic polycarbonate of improved color value and high molecular weight is obtained by the addition of phosphorous acid and/or a phosphorous ester to the melt polycondensation reaction medium containing aromatic diol, carbonate diester and a metal-containing compound as ester interchange catalyst during the polycondensation reaction

19 Claims, No Drawings

MELT PREPARATION OF POLYCARBONATE WITH METAL COMPOUND AND P COMPOUND CATALYSTS

BACKGROUND OF THE INVENTION

The present invention relates to a method for producing polycarbonate employing ester interchange.

More specifically, the present invention relates to a method for producing a high molecular weight aromatic polycarbonate with improved color from an aromatic diol and a carbonate diester.

Aromatic polycarbonates have recently been employed as engineering plastics with excellent mechanical properties such as impact strength as well as heat resistance and transparency.

A known method for producing such aromatic polycarbonates, the so-called phosgene process, involves reacting an aromatic diol such as bisphenol with phosgene via interfacial polycondensation. However, a great number of problems have been observed with regard to this process including the requirement of using extremely toxic phosgene, the disposal of a great amount of sodium chloride as a byproduct and health and environmental concerns for the methylene chloride generally employed as the reaction solvent in the process.

The so-called melt process, or non-phosgene process, has also been known for obtaining an aromatic polycarbonate via ester interchange between an aromatic diol and a carbonate diester. The non-phosgene method is regarded as advantageous in that it avoids the various problems of the phosgene process described above and in that the aromatic polycarbonate can be produced more economically.

However, in order to obtain a high molecular weight polycarbonate with excellent mechanical properties in accordance with the non-phosgene method using bisphenol A and diphenyl carbonate, it is required to distill phenol and diphenyl carbonate from a melt of a higher viscosity. Thus, the resulting polycarbonate is generally exposed to vacuum at a temperature of from 250° to 330° C. for a long period of time. The problem arises that the resulting polymer is yellow colored. Employing the non-phosgene method, products of a balanced quality between color value and molecular weight are generally difficult to produce.

With the object of improving the thermal stability and color value of aromatic polycarbonates, a variety of phosphorous compounds have been conventionally used in various methods.

With the object of improving the thermal stability, color value or resistance to hydrolysis of an aromatic polycarbonate during molding and kneading, one known method comprises adding various phosphorous compounds to the polycarbonate during molding and kneading, Japanese Patent Unexamined Publication Nos. 50-51154 and 52-147655, U.S. Pat. Nos. 3,305,520 and 3,404,122).

These methods, however, will not prevent the deterioration in color occurring during polymerization since the phosphorous compounds are added after the polymerization of the aromatic polycarbonates.

It is also known to use various phosphorous compounds in the polycondensation reaction for ester interchange. Illustrative of methods of this type are:

(a) use of a combination of a phosphonite and a hindered phenol in the presence of a quaternary ammonium compound (Japanese Patent Unexamined Publication No. 61-151236);

(b) use of diphenyl phosphonate in the presence of $KBH_4$ catalyst (Japanese Patent Unexamined Publication Nos. 62-158719 and 62-169821);

(c) effecting melt polycondensation with an electron donor phosphorous compound as catalyst (Japanese Patent Unexamined Publication No. 3-54223); and, (d) effecting melt polycondensation with ester interchange between an alicyclic diol and a carbonate diester (Japanese Patent Unexamined Publication No. 2-180954).

Employing these methods, however, it is difficult to obtain a high-molecular weight aromatic polycarbonate with excellent color.

SUMMARY OF THE INVENTION

It is an object of the present invention to provide a method for producing a high molecular weight aromatic polycarbonate with improved color by avoiding the problems associated with known melt polycondensation processes involving ester interchange (non-phosgene methods).

The method of the present invention has been achieved after extensive investigation to solve these problems.

That is, the present invention provides a method for producing an aromatic polycarbonate which comprises conducting melt polycondensation of an aromatic diol and a carbonate diester in the presence of a metal-containing compound as ester interchange catalyst and in the presence of phosphorous acid and/or a phosphorous ester to provide the aromatic polycarbonate.

DESCRIPTION OF THE PREFERRED EMBODIMENTS

The aromatic diol used in the present invention is represented by the following general formula:

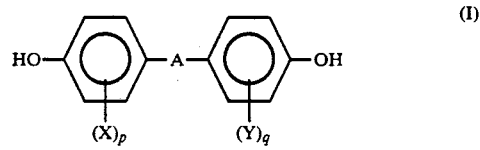

wherein A represents a single bond, a substituted or unsubstituted, linear, branched or cyclic divalent hydrocarbon group having up to about 15 carbon atoms, or a divalent group represented by —O—, —S—, —CO—, —SO— or —$SO_2$—, X and Y, each of which may be identical or different, are hydrogen, halogen or a hydrocarbon group having up to about 6 carbon atoms and p an q independently represent an integer of 0 to 2.

Some representative examples of aromatic diols useful in the practice of the present invention include bisphenols such as bis(4-hydroxydiphenyl) methane, 2,2-bis(4-hydroxyphenyl)propane, 2,2-bis(4-hydroxy-3-methylphenyl)propane, 2,2-bis(4-hydroxy-3-t-butylphenyl)propane, 2,2-bis(4-hydroxy-3,5-dimethylphenyl)propane, 2,2-bis(4-hydroxy-3,5-dibromo)propane, 4,4-bis(4-hydroxyphenyl)heptane, 1,1-bis(4-hydroxyphenyl)cyclohexane, and the like; biphenyls such as 4,4'-dihydroxybiphenyl, 3,3', 5,5'-tetramethyl-4,4'-biphenyl, and the like; bis(4-hydroxyphenyl)sulfone, bis(4-hydroxyphenyl)sulfide, bis(4-hydroxyphenyl)ether, bis(4-hydroxyphenyl)ketone, and the like.

Of these aromatic diols, 2,2-bis(4-hydyroxyphenyl)propane is preferred.

Combinations of these aromatic diols can also be used resulting in polycarbonate copolymers. A minor amount of a polyvalent phenol of three or more valences can be copolymerized if a branched aromatic polycarbonate is desired. In order to improve the thermal stability and hydrolytic stability of the desired aromatic polycarbonate, monovalent phenols such as p-t-butylphenol and p-cumylphenol can be used to end-cap the terminal hydroxyl groups.

Some representative examples of carbonate diesters useful in the practice of the present invention include dimethyl carbonate, diphenyl carbonate, ditolyl carbonate, bis(4-chlorophenyl)carbonate, bis(2,4,6-trichloro)-carbonate, and the like.

Generally, these carbonate diester compounds are used in stoichiometric excess relative to the aromatic diol, e.g., in amounts of from about 1.01 to about 1.30 moles, and preferably from about 1.02 to about 1.20 moles, per mole of aromatic diol.

Representative examples of the metal-containing compound used as the ester interchange catalyst herein include known ester interchange catalysts such as the acetates, carbonates, borates, nitrates, oxides, hydroxides, hydrides and alcoholates of such metals as the alkali metals, alkaline earth metals, zinc, cadmium, tin, antimony, manganese, cobalt, nickel, titanium, zirconium, and the like. Preferably, tin-containing ester interchange catalysts and combinations of two or more of such catalysts can be used herein.

Specific examples of ester interchange catalysts which can be used herein include lithium hydride, lithium borohydride, sodium borohydride, potassium borohydride, rubidium borohydride, cesium borohydride, beryllium borohydride, magnesium borohydride, calcium borohydride, strontium borohydride, barium borohydride, aluminum borohydride, titanium borohydride, tin borohydride, germanium borohydride, tetraphenoxy lithium, tetraphenoxy sodium, tetraphenoxy potassium, tetraphenoxy rubidium, tetraphenoxy cesium, sodium thiosulfate, beryllium oxide, magnesium oxide, tin (IV) oxide, dibutyltin oxide, dibutyltin laurate, beryllium hydroxide, magnesium hydroxide, germanium hydroxide, beryllium acetate, magnesium acetate, calcium acetate, tin (IV) acetate, germanium acetate, lithium carbonate, sodium carbonate, potassium carbonate, beryllium carbonate, magnesium carbonate, tin (IV) carbonate, germanium carbonate, tin (IV) nitrate, germanium nitrate, antimony trioxide, bismuth trimethyl carboxylate, and the like.

These catalysts may be used at from about $10^{-5}$ to about $10^{-1}$ moles, and preferably from about $10^{-5}$ to about $10^{-2}$ moles, per mole of aromatic diol employed in the process.

The present invention is characterized in that an aromatic polycarbonate is produced by using phosphorous acid and/or a phosphorous ester compound under melt polycondensation reaction conditions. Phosphorous compounds which have been employed in the conventional process, for example, phosphines such as tributyl phosphine, triphenyl phosphine, and the like, phosphoric esters such as tributyl phosphate, triphenyl phosphate, triphenyl phosphate, and the like, or phosphorous compounds such as triphenyl phosphine oxide, and the like, cannot achieve the effect of improving the color value of the polycarbonate product which is the object of the present invention.

Phosphorous acid which can be used in the present invention can be represented by the chemical formula $P(OH)_3$.

The phosphorous ester compounds which can be used herein can be represented by the following general formulas (II), (III) and (IV):

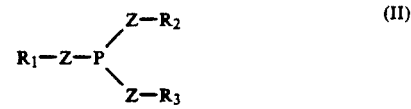

wherein $R_1$, $R_2$ and $R_3$ independently represent alkyl, allyl, cycloalkyl, aralkyl or alkylallyl of up to about 20 carbon atoms and Z represents a single bond or an oxygen atom with at least one of the Zs representing an oxygen atom.

Specific examples of phosphorous esters of formula (II) include triethyl phosphite, tributyl phosphite, tris(2-ethylhexyl) phosphite, tridecyl phosphite, tristearyl phosphite, triphenyl phosphite, tricresyl phosphite, tris(nonylphenyl) phosphite, tris(2,4-di-t-butylphenyl) phosphite, decyl-diphenyl phosphite, phenyl-di-2-ethylhexyl phosphite, phenyl-didecyl phosphite, tris(biphenyl) phosphite, tricyclohexyl phosphite and the like.

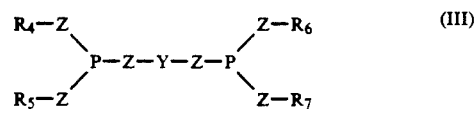

wherein $R_4$, $R_5$, $R_6$ and $R_7$ independently represent one of $R_1$, $R_2$ and $R_3$ as previously defined, Z is as previously defined and Y represents alkyl, allyl, cycloalkyl, aralkyl or alkylallyl of up to about 30 carbon atoms.

Specific examples of phosphorous esters of formula (III) include tetraphenyl-4,4'-isopropylidene-diphenol disphosphite, tetratridecyl-4,4'-isopropylidene-diphenol diphosphite, tetratridecyl-4,4'-butylidene bis(3-methyl-6-t-butylphenol) diphosphite, tetrakis(2,4-di-t-butylphenyl-4,4'-biphenylene phosphite, and the like.

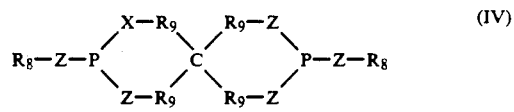

wherein $R_8$ represents an alkyl, allyl, cycloalkyl, aralkyl or alkylallyl of up to about 30 carbon atoms, $R_9$ represents an alkyl having up to about 20 carbon atoms and Z is as previously defined.

Specific examples of phosphorous esters of formula (IV) include bis(stearyl)pentaerythritol diphosphite, bis(2,6-di-6-butylphenylpentaerythritol diphosphite, bis(nonylphenyl)pentaerythritol diphosphite, and the like.

Of the various phosphorous esters described above, tributyl phosphite, triphenyl phosphite, bis(stearyl) pentaerythritol diphosphite and bis(2,6-di-t-butylphenyl) pentaerythritol diphosphite are preferred. The phosphorous compound of the present invention can be added to the melt polycondensation reaction medium for ester interchange at any point provided, of course, its intended effect is achieved. Preferably, the phosphorous compound is added during an appropriate reaction stage prior to the final reaction stage.

At the initiation of the reaction, the phosphorous compound can be added simultaneously with the monomers such as the aromatic diol, the carbonate diester and the metal-containing compound ester interchange catalyst which are then mixed together.

In accordance with the present invention, the phosphorous compound is used in at least an amount sufficient to substantially prevent deterioration of the color of the polymer during the melt polycondensation reaction with ester interchange. Amounts of phosphorous compound of from about $10^{-5}$ to about $10^{-1}$ moles, and preferably from about $10^{-4}$ to about $10^{-2}$ moles, per mole of aromatic diol compound are generally sufficient to accomplish this. Amounts less than about $10^{-5}$ moles may not be sufficient to improve the color of the polycarbonate; above about $10^{-1}$ moles the mechanical strength of the resulting polycarbonate may be reduced. Phosphorous acid or phosphorous ester can be used in an amount of from about 0.03 to about 50 moles, preferably from about 0.1 to about 5 moles, per mole of metal-containing compound used as the ester interchange catalyst.

In accordance with the present invention, melt polycondensation involving ester interchange can be effected in accordance with known melt polycondensation procedures for producing aromatic polycarbonates except that a phosphorous compound is added during the reaction. Such melt polycondensation procedures include heating under atmospheric or reduced pressure while removing byproducts of the ester interchange reaction. The melt polycondensation reaction herein can generally be effected in multiple stages, e.g., two or three stages. The first stage reaction comprises heating the reactants and catalyst at a temperature of 100° to 200° C. in an inert gas atmosphere under atmospheric or reduced pressure. During the first stage reaction, the ester interchange reaction takes place along with the formation of a low molecular weight oligomer having a number average molecular weight of from about 400 to about 1,000. The second stage reaction comprises raising the temperature of the system to about 200° to about 250° C. and continuing the ester interchange reaction while forming a low-molecular weight oligomer with a number average molecular weight of from about 1,000 to about 7,000 and effecting the chain lengthening reaction by bringing about a condition of reduced pressure, for example, of from about 1 to about 20 Torr thereby generating alcohol or phenol which is then removed from the system. In order to increase the chain length of the oligomer further, principally alcohols or phenols and carbonate diesters are removed from the reaction medium in a third stage under a temperature of from about 250° to about 330° C. and a vacuum of from about 0.1 to about 1 Torr or less whereby the high-molecular weight aromatic polycarbonate of this invention is obtained.

The duration of each reaction stage can be adjusted in accordance with the progress of the reaction. In terms of the color value of the polymer obtained, reaction time has little effect when the temperature does not exceed about 200° C. Generally from about 0.5 to about 5 hours reaction time is suitable at this temperature. At a temperature of from about 200° to about 250° C., a reaction time of from about 0.1 to about 3 hours is generally suitable. Since prolonged reaction times may have significantly adverse effects on the color tone of the polymer when the reaction temperature exceeds about 250° C., the reaction time in the final reaction stage is preferably from about 0.1 to about 1 hour depending on the molecular weight of the polycarbonate desired.

The phosphorous compound of the present invention is preferably added during an appropriate reaction stage prior to the final stage of the process. As previously stated, the addition of the phosphorous compound simultaneously with a monomer is one particular embodiment of the present invention.

The aromatic polycarbonate obtained by the method of the present invention has a relatively high molecular weight, e.g., a number average molecular weight (Mn) of from about 10,000 to about 30,000 and a weight average molecular weight (Mw) of from about 20,000 to about 70,000, the Mw/Mn value preferably being from about 2 to about 4.

According to the measurement procedure described hereinbelow, the color value of the polycarbonate obtained by the practice of the present invention is not greater than about 0.1 and is preferably within the range of from about 0.01 to about 0.08.

The method of the present invention will specifically be explained in the working examples which follow. The aromatic polycarbonates of the examples were measured for color value and molecular weight in accordance with the following procedures:

(1) Color

After thermal treatment at 280° C., the polymer was dissolved in a solvent, methylene chloride, to a concentration of 4 g/100 ml, which was then placed in a cell of a 10 mm optical path. The absorbance at 345 nm was measured by an ultraviolet spectrophotometer. It has been found that the value has a good first-order correlation with the press sheet b value of the polycarbonate at 280° C., so the color at the absorbance value was evaluated. A smaller numerical value represents better polymer color tone. For example, the color value of the polycarbonate obtained by the phosgene method is in the range of from about 0.030 to about 0.040.

(2) Molecular Weight

Molecular weight is determined as a GPC polystyrene-reduced molecular weight at 35° C. using chloroform solvent.

EXAMPLE 1

In a 300 ml capacity SUS reactor equipped with a stirrer and a distillation unit were placed 0.10 moles of bisphenol A, 0.108 moles of diphenyl carbonate, 0.16 mmoles of dibutyltin oxide as a catalyst and 0.27 mmoles (200mg) of bis(stearyl)pentaerythritol diphosphite and left in a molten state at 150° C. for 1 hour. After raising the temperature to 200° C., the pressure was gradually decreased to 20 Torr. These conditions were maintained for 1 hour to distill phenol. Subsequently, the pressure was decreased to 0.3 Torr and the temperature raised to 270° C. for polycondensation for 30 minutes resulting in the production of about 25 g of polymer.

According to GPC, the resulting polymer had a molecular weight of Mn=13,800 and Mw=46,300.

In order to measure the color of the resulting polymer, the ultraviolet absorbance ($A_{345}$) was measured after thermally treating the polymer in ambient atmosphere at 280° C. for 15 minutes. The color value was 0.032.

COMPARATIVE EXAMPLE 1

The same conditions were employed for the synthesis of polycarbonate polymer as in Example 1, supra, except that no phosphorous compound was used.

According to GPC, the resulting polymer had a molecular weight of Mn=8,200 and Mw=22,700.

Using the same color measurement procedure as in Example 1, the $A_{345}$ value of the polymer was 0.129.

COMPARATIVE EXAMPLE 2

The following experiment demonstrates that the advantages of the present invention will not be achieved if the phosphorous compound is added after polymerization.

Five grams of the polymer obtained in Comparative Example 1 and the solution of 400 mg of the phosphorous compound used in Example 1 dissolved in 300 ml of hexane were mixed together followed by evaporation of hexane at 30° to 35° C. in an evaporator to obtain a uniform mixture of the polymer and the phosphorous compound. The mixture was dried at 120° C. under reduced pressure followed by the same thermal treatment as in Example 1. The color of the resulting product had an $A_{345}$ value of 0.115.

The results described above show that there will be at most only a slight improvement in the color value of the polymer if the phosphorous compound of the present invention is added in the same proportion to the polymer after completion of polymerization whereas the method of the present invention which requires addition of the phosphorous compound during polymerization results in a dramatic improvement in color and has the further desirable effect of increasing the molecular weight of the polycarbonate product.

EXAMPLES 2 TO 6

Except that the various phosphorous compounds shown in Table 1 were used at $1.0 \times 10^{-3}$ moles per mole of bisphenol A, the same conditions were employed for the synthesis of polymer as in Example 1. Table 1 sets forth the color values and the molecular weights for the resulting polymers, these values having been determined by the same procedures as in Example 1.

EXAMPLES 7 TO 9

Except that the amount of the phosphorous compound to be used was modified as set forth in Table 2, the same conditions as in Example 1 were employed for the synthesis of the polymers of these examples. Table 2 sets forth the results as follows:

TABLE 2

| Exam. No. | Amount of phosphorous compound* in molar ratio to bisphenol A (mg) | Polymer color tone $A_{3+5}$ | Molecular weight | |
|---|---|---|---|---|
| | | | Mn | Mw |
| 7 | $0.68 \times 10^{-3}$ (50) | 0.077 | 14,600 | 36,100 |
| 8 | $1.4 \times 10^{-3}$ (100) | 0.066 | 12,300 | 34,500 |
| 9 | $5.5 \times 10^{-3}$ (400) | 0.038 | 11,800 | 34,200 |

*bis(stearyl)pentaerythritol diphosphite

EXAMPLE 10

This example examines the effect of the timing of the addition of the phosphorous compound in the method of the present invention.

As in Example 1, the same monomers and catalyst in the same amounts were placed in a reactor and maintained in the molten state at 150° C. for one hour. After raising the temperature to 200° C., the pressure was gradually decreased to 20 Torr and maintained under these conditions for one hour to distill phenol. Subsequently, the same amount (200 mg) of the phosphorous compound used in Example 1 was added to the reactor. Thereafter, the pressure was decreased to 0.3 Torr and the temperature increased to 270° C. for the continuation of the polycondensation reaction to provide the polymer.

The polymer had a molecular weight of Mn=11,300 and Mw=30,400 and a color ($A_{345}$) of 0.044.

EXAMPLE 11

The same conditions as in Example 1 were employed to synthesize the polymer of this example except that 100 mg (0.16 mmoles) of dibutyltin dilaurate ($Bu_2Sn(O_2CC_{11}H_{25})_2$)) was used as the ester interchange catalyst. The results are set forth in Table 3.

COMPARATIVE EXAMPLE 3

The same conditions as in Example 1 were employed for the synthesis of the polymer of this example except

TABLE 1

| Exam. No. | Phosphorous compound | Amount of Phosphorous compound in molar ratio to bisphenol A (mg) | Polymer color tone $A_{3+5}$ | Molecular weight | |
|---|---|---|---|---|---|
| | | | | Mn | Mw |
| 1 | bis(stearyl) pentaerythritol diphosphite | $2.7 \times 10^{-3}$ (200) | 0.032 | 13,800 | 46,300 |
| 2 | tributyl phosphite | $1.0 \times 10^{-3}$ (26) | 0.087 | 13,000 | 29,900 |
| 3 | triphenyl phosphite | $1.0 \times 10^{-3}$ (32) | 0.063 | 9,500 | 25,500 |
| 4 | tristearyl phosphite | $1.0 \times 10^{-3}$ (84) | 0.047 | 11,800 | 28,300 |
| 5 | bis(2,6-di-t-butylphenyl) pentaerythritol diphosphite | $1.0 \times 10^{-3}$ (61) | 0.051 | 15,100 | 36,500 |
| 6 | hydroxy phosphite | $1.0 \times 10^{-3}$ (10) | 0.065 | 11,400 | 29,800 |
| Comparative Example | | | | | |
| 1 | — | — | 0.129 | 8,200 | 22,700 | that no phosphorous compound was used. The results are set forth in Table 3.

employed the same conditions as in Example 1, the results being set forth in Table 4.

TABLE 4

| Comparative Example | Phosphorus compound | Amount of Phosphorous Compound in Molar Ratio to bisphenol A (mg) | Polymer color tone $A_{3+5}$ | Molecular weight | |
|---|---|---|---|---|---|
| | | | | Mn | Mw |
| 8 | a) PBu$_3$ | $1.0 \times 10^{-3}$ (20) | 0.165 | 13,200 | 29,300 |
| 9 | b) (BuO)$_3$P=O | $1.0 \times 10^{-3}$ (27) | 0.270 | 7,200 | 20,800 |
| 10 | c) (PhO)$_3$P=O | $1.0 \times 10^{-3}$ (33) | 0.135 | 15,600 | 35,200 |
| 11 | d) Ph$_3$P=O | $1.0 \times 10^{-3}$ (28) | 0.195 | 15,700 | 37,700 | a) tributyl phosphite
b) tributyl phosphate
c) triphenyl phophate
d) triphenyl phosphine oxide

EXAMPLES 12 TO 14

The same conditions as in Example 1 were employed to synthesize the polymers of these examples except that 0.5 mmoles or 0.16 mmoles of lithium hydride (LiH) or 0.16 mmoles of calcium acetate was used as the ester interchange catalyst. The results are set forth in Table 3.

COMPARATIVE EXAMPLES 4 TO 6

The same conditions as in Examples 12 to 14 including the types and amounts of the metal-containing compound ester interchange catalysts were employed herein except that no phosphorous compound was used. The results are set forth in Table 3.

TABLE 3

| | Amount of Phosphorous compound* in molar ratio to bisphenol (A) (mg) | Ester Interchange Catalyst | | Polymer color tone $A_{3+5}$ | Molecular weight | |
|---|---|---|---|---|---|---|
| | | type | amount (mmoles) | | Mn | Mw |
| Exam. 11 | $2.7 \times 10^{-3}$ (200) | Bu$_2$SN(O$_2$CC$_{11}$H$_{25}$)$_2$ | 0.16 | 0.024 | 11,300 | 35,600 |
| Comp. Exam. 3 | — | Bu$_2$SN(O$_2$CC$_{11}$H$_{25}$)$_2$ | 0.16 | 0.110 | 11,500 | 33,900 |
| Exam. 12 | $2.7 \times 10^{-3}$ (200) | LiH | 0.50 | 0.700 | 12,500 | 32,400 |
| Comp. Exam. 4 | — | LiH | 0.50 | 1.65 | 9,400 | 20,300 |
| Exam. 13 | $2.7 \times 10^{-3}$ (200) | LiH | 0.16 | 0.180 | 9,800 | 30,600 |
| Comp. Exam. 5 | — | LiH | 0.16 | 0.580 | 8,600 | 24,300 |
| Exam. 14 | $2.7 \times 10^{-3}$ (200) | Ca(O$_2$CCH$_3$)$_2$ | 0.16 | 0.091 | 9,700 | 24,500 |
| Comp. Exam. 6 | — | Ca(O$_2$CCH$_3$)$_2$ | 0.16 | 0.117 | 10,000 | 24,900 |

*bis(stearyl)pentaerythritol diphosphite

EXAMPLE 15

The same conditions were employed as in Example 1 except that 0.05 moles of bisphenol A and 0.05 moles of bis(4-hydroxyphenyl)methane were used as the aromatic diol compounds so as to provide a copolymer.

The resulting copolymer had a molecular weight of Mn=10,500 and Mw=39,500 and color ($A_{3\,4\,5}$) of 0.040.

COMPARATIVE EXAMPLE 7

The same conditions as in Example 15 were employed herein except that no phosphorous compound was used. The copolymer had a molecular weight of Mn=7,500 and Mw=19,800 and an $A_{3\,4\,5}$ value of 0.125.

COMPARATIVE EXAMPLES 8 TO 11

These examples show that the advantages of the present invention cannot be achieved with phosphorous compounds that are outside the scope of the invention (e.g., as identified in Table 4 below). These examples The foregoing examples show that the process of the present invention provides high molecular weight aromatic polycarbonate having excellent color properties.

COMPARATIVE EXAMPLE 12

The following experiment demonstrates that the advantage of the present invention will not be achieved if a combination of a phosphorous compound and an ester interchange catalyst is not used. The same conditions were employed for the synthesis of polycarbonate as in Example 2, supra, except that no dibutyltin was used, and an oligomer having a molecular weight of Mn =930 and Mw =1830 was obtained.

The result described above shows that this example provides no aromatic polycarbonate of practical use.

What is claimed is:

1. A method for producing an aromatic polycarbonate which comprises melt polycondensing an aromatic diol and a carbonate diester in the presence of a metal-containing compound as ester interchange catalyst and in the presence of a compound selected from the group consisting of phosphorous acid, a phosphorous ester and mixtures thereof.

2. The method according to claim 1 wherein the ester interchange catalyst is selected from the group consisting of acetate, carbonate, borate, nitrate, oxide, hydroxide, hydride and alcoholate of a metal selected from the group consisting of alkali metal, an alkaline earth metal, zinc, cadmium, tin, antimony, manganese, cobalt, nickel, titanium and zirconium.

3. The method according to claim 2 wherein the ester interchange catalyst is selected from the group consisting of dibutyltin oxide, dibutyltin laurate, tin oxide, tin acetate, tin carbonate, tin nitrate, lithium hydride, lithium borohydride and calcium acetate.

4. The method according to claim 1 wherein the phosphorous ester compound is represented by the general formula:

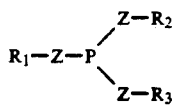

wherein $R_1$, $R_2$ and $R_3$ independently represent alkyl, allyl, cycloalkyl, aralkyl or alkylallyl of up to about 20 carbon atoms and Z represents a single bond or Z is an oxygen atom with at least one of the Zs representing an oxygen atom.

5. The method according to claim 4 wherein the phosphorous ester is selected from the group consisting of triethyl phosphite, tributyl phosphite, tris(2-ethylhexyl) phosphite, tridecyl phosphite, tristearyl phosphite, triphenyl phosphite, tricresyl phosphite, tris(nonylphenyl) phosphite, tris(2,4-di-t-butylphenyl) phosphite, decyldiphenyl phosphite, phenyl-di-2-ethylhexyl phosphite, phenyl-didecyl phosphite, tris(biphenyl) phosphite and tricyclohexyl phosphite.

6. The method according to claim 1 wherein the phosphorous ester is represented by the general formula:

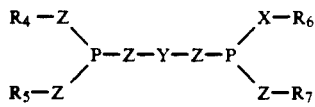

wherein $R_4$, $R_5$, $R_6$ and $R_7$ independently represent alkyl, allyl, cycloalkyl, aralkyl or alkylallyl of up to about 20 carbon atoms, Z represents a single bond or an oxygen atom with at least one of the Zs representing an oxygen atom and Y represents alkyl, allyl, cycloalkyl, aralkyl or alkylallyl of up to about 30 carbon atoms.

7. The method according to claim 6 wherein the phosphorous ester is selected from the group consisting of tetraphenyl-4,4'-isopropylidene-diphenol diposphite, tetratridecyl-4,4'-isopropylidene-diphenol diphosphite, tetratridecyl-4,4'-butylidene bis(3-methyl-6-t-butylphenol) diphosphite and tetrakis(2,4-di-t-butylphenyl-4,4'-biphenylene phosphite.

8. The method according to claim 1 wherein the phosphorous ester is represented by the general formula:

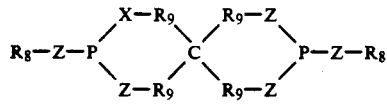

wherein $R_8$ represents alkyl, allyl, cycloalkyl, aralkyl or alkylallyl of up to about 30 carbon atoms, $R_9$ represents an alkyl of up to about 20 carbon atoms and Z represents a single bond or Z is an oxygen atom with at least one of the Zs representing an oxygen atom.

9. The method according to claim 8, wherein the phosphorous ester is selected from the group consisting of bis(stearyl)pentaerythritol diphosphite, bis(2,6-di-t-butylphenyl)pentaerythritol diphosphite and bis(nonylphenyl)pentaerythritol diphosphite.

10. The method according to claim 1 wherein the carbonate diester is present at a level of from about 1.01 to about 1.30 moles per mole of aromatic diol.

11. The method according to claim 1 wherein the phosphorous acid or phosphorous ester is present at a level of from about $10^{-5}$ to about $10^{-1}$ moles per mole of aromatic diol.

12. The method according to claim 1 wherein the ester interchange catalyst is present at a level of from about $10-5$ to about $10^{-1}$ moles per mole of aromatic diol.

13. The method according to claim 1 wherein the phosphorous acid or phosphorous ester is present at a level of from about 0.03 to about 50 moles per mole of ester interchange catalyst.

14. The method according to claim 1 wherein the aromatic diol is represented by the general formula:

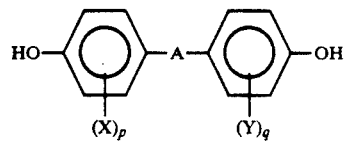

wherein A represents a single bond, a substituted or unsubstituted, linear, branched or cyclic hydrocarbon group of up to about 15 carbon atoms or a divalent group represented by —O—, —S—, —CO—, —SO— or —SO$_2$—, X and Y, each of which is identical or different, are hydrogen, halogen or a hydrocarbon group of up to about 6 carbon atoms and p and q independently represent an integer of 0 to 2.

15. The method according to claim 14 wherein the aromatic diol is selected from the group consisting of bisphenols, biphenyls, bis(4-hydroxyphenyl)sulfone, bis(4-hydroxyphenyl)sulfide, bis(4-hydroxyphenyl)ether and bis(4-hydroxyphenyl)ketone.

16. The method according to claim 15 wherein the bisphenol is selected from the group consisting of bis(4-hydroxydiphenyl)methane, 2,2-bis(4-hydroxyphenyl)propane, 2,2-bis(4-hydroxy-3-methylphenyl)propane, 2,2-bis(4-hydroxy-3-t-butylphenyl)propane, 2,2-bis(4-hydroxy-3,5-dimethylphenyl)propane and 4,4-bis(4-hydroxyphenyl)heptane, 1,1-bis-(4-hydroxyphenyl)cyclohexane and the biphenyl is selected from the group consisting of 4,4'-dihydroxybiphenyl and 3,3', 5,5'-tetramethyl-4,4'-biphenyl.

17. The method according to claim 1 wherein the carbonate diester is selected from the group consisting of dimethyl carbonate, diphenyl carbonate, ditolyl carbonate, bis(4-chlorophenyl)carbonate, and bis(2,4,5-trichlorophenyl) carbonate.

18. The method according to claim 1 wherein the aromatic polycarbonate has a number average molecular weight (Mn) of from about 10,000 to about 30,000, a weight average molecular weight (Mw) of from about 20,000 to about 70,000 and a value for Mw/Mn of from about 2 to about 4.

19. The method according to claim 1 wherein the aromatic polycarbonate has a color value ($A_{345}$) of not greater than about 0.1.

* * * * *